United States Patent
Han et al.

(10) Patent No.: US 7,724,899 B2
(45) Date of Patent: May 25, 2010

(54) METHOD FOR CONTROLLING SECURITY CHANNEL IN MAC SECURITY NETWORK AND TERMINAL USING THE SAME

(75) Inventors: Kyeong Soo Han, Daejeon (KR); Jee Sook Eun, Chunlabook-do (KR); Yool Kwon, Busan (KR)

(73) Assignee: Electronics and Telecommunications Research Insitute, Daejeon (KR)

( * ) Notice: Subject to any disclaimer, the term of this patent is extended or adjusted under 35 U.S.C. 154(b) by 838 days.

(21) Appl. No.: 11/634,995

(22) Filed: Dec. 7, 2006

(65) Prior Publication Data

US 2007/0133791 A1 Jun. 14, 2007

(30) Foreign Application Priority Data

Dec. 7, 2005 (KR) .............. 10-2005-0118806
Jul. 28, 2006 (KR) .............. 10-2006-0071517

(51) Int. Cl.
*G06F 11/00* (2006.01)
*H04L 9/00* (2006.01)
*G06F 7/04* (2006.01)

(52) U.S. Cl. .............. 380/46; 726/27; 726/28; 726/29; 726/30; 380/44; 380/45; 380/47

(58) Field of Classification Search .............. 380/46
See application file for complete search history.

(56) References Cited

FOREIGN PATENT DOCUMENTS

| KR | 1020030015842 | 2/2003 |
|----|---------------|--------|
| KR | 1020030027459 | 4/2003 |
| KR | 1020050089736 | 9/2005 |
| KR | 1020060067099 | 6/2006 |
| KR | 1020060071836 | 6/2006 |
| KR | 1020060091018 | 8/2006 |
| WO | 2005/067198   | 7/2005 |

OTHER PUBLICATIONS

Security Task Group of IEEE 802.1, Media Access Control (MAC) Security, IEEE P802.1AE/D5.1, Jan. 19, 2006, pp. 1-150.

*Primary Examiner*—Longbit Chai
(74) *Attorney, Agent, or Firm*—Lowe Hauptman Ham & Berner LLP

(57) ABSTRACT

A method for controlling a security channel for reducing system load by extending the use period of a security association key is provided. In this method, an upper bit initial value of an initialization vector of an encryption algorithm and a using range thereof are shared between a transmitting side and a receiving side when a security channel is created. Then, a secure association is created between a transmitting side and a receiving side by setting an association number, a next packet number which is a lower bit value of an initialization vector, and a secure association key. Afterward, a packet number is modified whenever a frame is transmitted until all of packet numbers are used. When all packet numbers are used, the upper bit value of the initialization vector changes.

6 Claims, 6 Drawing Sheets

US 7,724,899 B2
METHOD FOR CONTROLLING SECURITY CHANNEL IN MAC SECURITY NETWORK AND TERMINAL USING THE SAME

CLAIM OF PRIORITY

This application claims the benefit of Korean Patent Application No. 2005-118806 filed on Dec. 7, 2005, and Korean Patent Application No. 2006-71517 filed on Jul. 28, 2006, in the Korean Intellectual Property Office, the disclosure of which is incorporated herein by reference.

BACKGROUND OF THE INVENTION

1. Field of the Invention

The present invention relates to a method for controlling a security channel for reducing system load by extending the use period of an security association key for providing a secure service between ports or terminals in a MAC security network that provides a MAC security service based on IEEE 802.1AE.

2. Description of the Related Art

In order to provide security and authentication function for transmitting frames in a network layer, an IP security (IPSEC) protocol or an application level security function such as password has been used.

As a local area network (LAN) has been enlarged, a bandwidth thereof was broadened and a fast L2 switching technology was introduced, a communication service using a data link layer only was recently introduced. Accordingly, it requires a security and authentication process for frames in a data link layer.

IEEE 802 organizes an IEEE 802.1AE work group for standardizing structures and plans for a MAC security technology of a data link layer. Also, the confidentiality, the integrity, and the authentication of the frames in the communication using the data link layer are provided through the standard defined by IEEE 802.1AE work group.

The specifications recently introduced by IEEE 802.1AE will be briefly described. In IEEE 802.1AE clause 14, GCM-AES-128 is recommended to use as the encryption algorithm. However, any other algorithm that satisfies the specifications introduced from the IEEE 802.1AE can be used instead of using the GSM-AES-128, FIG. 1 is a diagram illustrating a structure of a MAC security frame introduced by IEEE 802.1AE.

Referring to FIG. 1, the MAC frame structure introduced by IEEE 802.1AE includes a MAC address field storing a destination address and a source address of a corresponding packet. The MAC frame structure also includes a secure data field that stores coded user data, and a secure TAG (secTAG) field interposed between the MAC address field and the secure data field for transferring encryption parameters. Furthermore, the MAC frame structure includes an ICV field attached at the end of the secure data. The ICV field stores an integrity check value (ICV) for checking the integrity of a corresponding secure data.

With reference to FIG. 2 and FIG. 3, a security service introduced by IEEE 802.1AE will be described as follows.

A transmitting terminal for exchanging MAC secure frames having the structure shown in FIG. 1 creates security association with a receiving side by sharing a security association key (SAK), and the predetermined part of an initialization vector (IV) of an encryption algorithm. When a transmitting frame is generated, the transmitting terminal attaches the security TAG (secTAG) after the source address (SA) field of the transmitting frame, where the secTAG includes encryption parameters. Then, the transmitting terminal places secure data at the back of the secTAG, where the secure data is user data that is encoded using the encryption parameters stored in the secTAG. The transmitting terminal also calculates an integrity check value (ICV) using an authentication key related to the corresponding security and adds the calculated ICV into the frame.

The secTAG includes an association number (AN), a packet number (PN), and encryption data such as V, ES, SC, SCB, E, C, SL, SCI, and etc.

The PN is a packet number sequentially assigned to frames which are transmitted within a same security association key. As shown in FIG. 4, the packet number is formed of lower 32 bits of an initialization vector. The secure data is encrypted using the upper bit value of an initialization vector, which is shared with the receiving side, the initialization vector constituent of the packet number, and the security association key.

Therefore, a receiving terminal in a MAC secure service network receives a MAC secure frame having a destination address (DA), a source address (SA), a SecTAg, a secure data, an ICV, and a FCS. Then, the receiving terminal calculates an integrity check value (ICV) using the authentication key of the secure association shared with the transmitting side, and compares the calculated ICV and the ICV in the received frame. If they are identical, the receiving terminal determines that the received frame has the integrity, and if not, the receiving terminal destroys the received frame.

Then, the receiving terminal extracts encryption parameters and the packet number (PN) from the SecTAg included in the ICV checked frame. After extracting, the receiving terminal generates an initialization vector by combining the upper bits of the initialization vector, which are shared with the transmitting side, with the packet number. Then, the secure data is decoded using the generated initialization vector and the security association key.

Then, an Ethernet frame is restored by combining the destination address, the source address, the restored data and the FCS.

As described above, the transmitting and receiving frames are secured in the MAC secure service network. That is, the transmitting side and the receiving side are synchronized by changing the lower 32 bits of the 96 bit initialization vector using the PN of the MAC secure frame with the upper 64 bits of the initialization vector that is shared with the transmitting side.

According to a method introduced by IEEE 802.1AE, a same PN cannot be repeatedly used for the identical security association key. Therefore, after using all of the PN numbers, the security association key must change. Since the security association key is 128 bits, it requires the great amount of computation power to generate, manage and distribute the security association key. In order to distribute a new security association key, corresponding messages must be exchanged, additionally.

That is, the PN value used in the MAC security is 32 bits, and 0 cannot be used as the PN value. Accordingly, total $2^{32}-2$ PNs are available. If it assumes that the PN value starts from 1 and increases by 1 when a frame is transmitted, the security association key must change at every $2^{32}-2$ frames.

As the worst case, it assumes that the length of the Ethernet frame is 64 bytes, and a transmit rate is a giga-bit Ethernet level. Under these assumptions, a use period Tk of a security association key can be calculated as Eq. 1. Herein, a MACsec framing overhead is 24 bits.

$$Tk = (Lf + Lp + Lo + Lg) \times (2^{32} - 2) \times 8 \text{ ns} \quad \text{Eq. 1}$$
$$= (64 + 8 + 24 + 12 +) \times (2^{32} - 2) \times 8 \text{ ns}$$
$$= 3710 \text{ sec}$$

In Eq. 1, Lf denotes the length of a frame in a unit of a byte, Lp denotes the length of a preamble in a unit of a byte, Lo denotes the length of overhead in a unit of a byte, Lg denotes a gap between frames in a unit of a byte, and 8 ns is a time taken to transmit one byte through a giga-bit network.

According to the calculation in Eq. 1, the use period for the security association key is about one hour in the worst case. That is, the security association key needs to be generated and distributed at every one hour. Since the generation and distribution of the security association key is an event generating in one direction, the security association key is generated and distributed twice at every one hour for two direction event.

As described above, according to the convention method, the security association key needs to be generated and distributed whenever $2^{32}$-2 frames are transmitted because of the short life time of the security association key. Therefore, the system load increases due to frequent generation and distribution of the security association key. Also, it requires many messages to exchange for generating and distributing the security association key.

SUMMARY OF THE INVENTION

The present invention has been made to solve the foregoing problems of the prior art and it is therefore an object of certain embodiments of the present invention to provide a method of controlling a security channel in a MAC security network for reducing a system load, which occurs by generating and distributing a security association key, by extending a use period of a security association key in a communication network providing MAC secure services, and a terminal of a MAC secure service network using the same.

According to an aspect of the present invention, there is provided a method for controlling a security channel in a MAC security service network performing an encoding of a transmitting/receiving frame using a parameter including a security association key and an initialization vector, including the steps of: a) sharing an upper bit initial value of an initialization vector of an encryption algorithm and a using range thereof between a transmitting side and a receiving side when a security channel is created; b) creating a secure association between a transmitting side and a receiving side by setting an association number, a next packet number which is a lower bit value of an initialization vector, and a secure association key; c) changing a packet number whenever a frame is transmitted until all of packet numbers are used; and d) changing the upper bit value of the initialization vector when all of packet numbers are used, and performing the step b).

According to another aspect of the present invention, there is provided a method for controlling a security channel in a MAC secure service network performing an encoding of a transmitting/receiving frame using a parameter including an security association key and an initialization vector, the method at a receiving side including the steps of: a) setting an upper bit initial value of an initialization vector of an encryption algorithm, and a using range thereof when a security channel is created; b) creating a secure association between a transmitting side and a receiving side by setting an association number, a next packet number which is a lower bit value of an initialization vector, and a secure association key; c) determining whether a packet number described in a frame received through the security channel is a maximum packet number or not; and d)changing the upper bit value of the initialization vector if the described packet number is the maximum packet number, and performing the step b).

The encrypted frame may include a destination address field, a source address field, a secure TAG field including a packet number and an association number of a security association, an encoded data field, and an integrity check value (ICV) field having the ICV for checking the integrity of corresponding frame.

The upper bit value of the initialization vector may be the upper 64 bits among the 96 bits of the initialization vector.

The association number changes when the upper bit value of the initialization vector changes to prevent a replay attack.

According to a further aspect of the present invention, there is provided a terminal of a MAC security service network including: a key management module for setting an upper bit value of an initialization vector, a packet number that is a lower bit value, and using ranges thereof, and changing the upper bit value of the initialization vector and the packet number so that the initialization vector dose not have an identical value within a same security association key; an encryption module for encrypting a transmitting frame using an security association key and an initialization vector, which are provided from the key management module; and a transmitting unit for transmitting the encrypted frame from the encryption module.

According to a further aspect of the present invention, there is provided a terminal of a MAC security service network including: a receiver for receiving an encrypted frame from a communication network; a key management module for setting an upper bit value of an initialization vector, and a using range thereof, and changing the upper bit value of the initialization vector so that the initialization vector does not have an identical value within a same security association key; and a decode module for decoding the received frame from the receiver using an security association key and an upper bit of an initialization vector, which are provided from the key management module, and a packet number included in the received frame.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

The present invention will now be described more fully hereinafter with reference to the accompanying drawings, in which preferred embodiments of the invention are shown.

Figure 5:
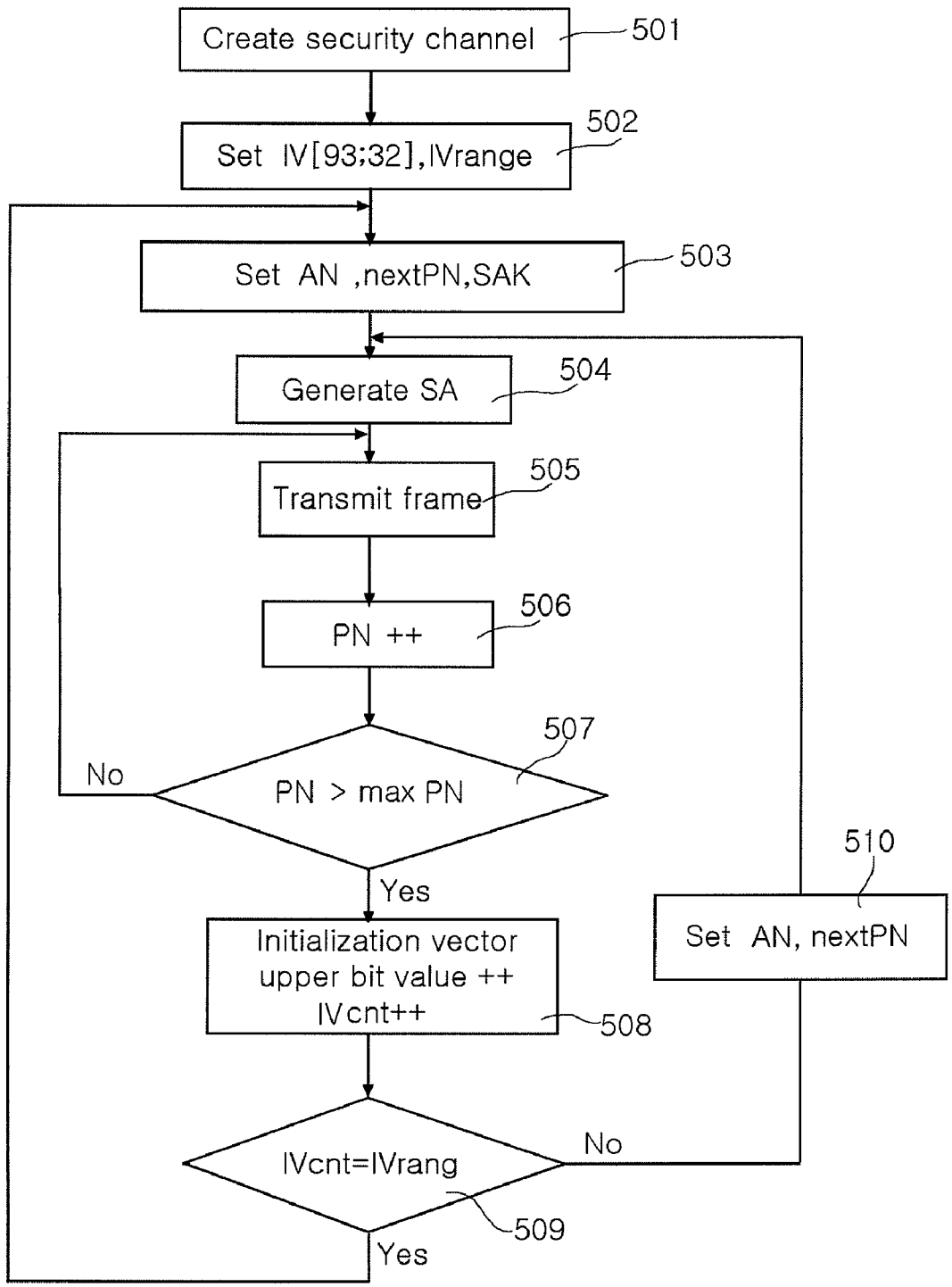
FIG. 5 is a flowchart illustrating a processing procedure of a transmitting side in a method for controlling a security channel in a MAC security service network according to an embodiment of the present invention.
Figure 6:
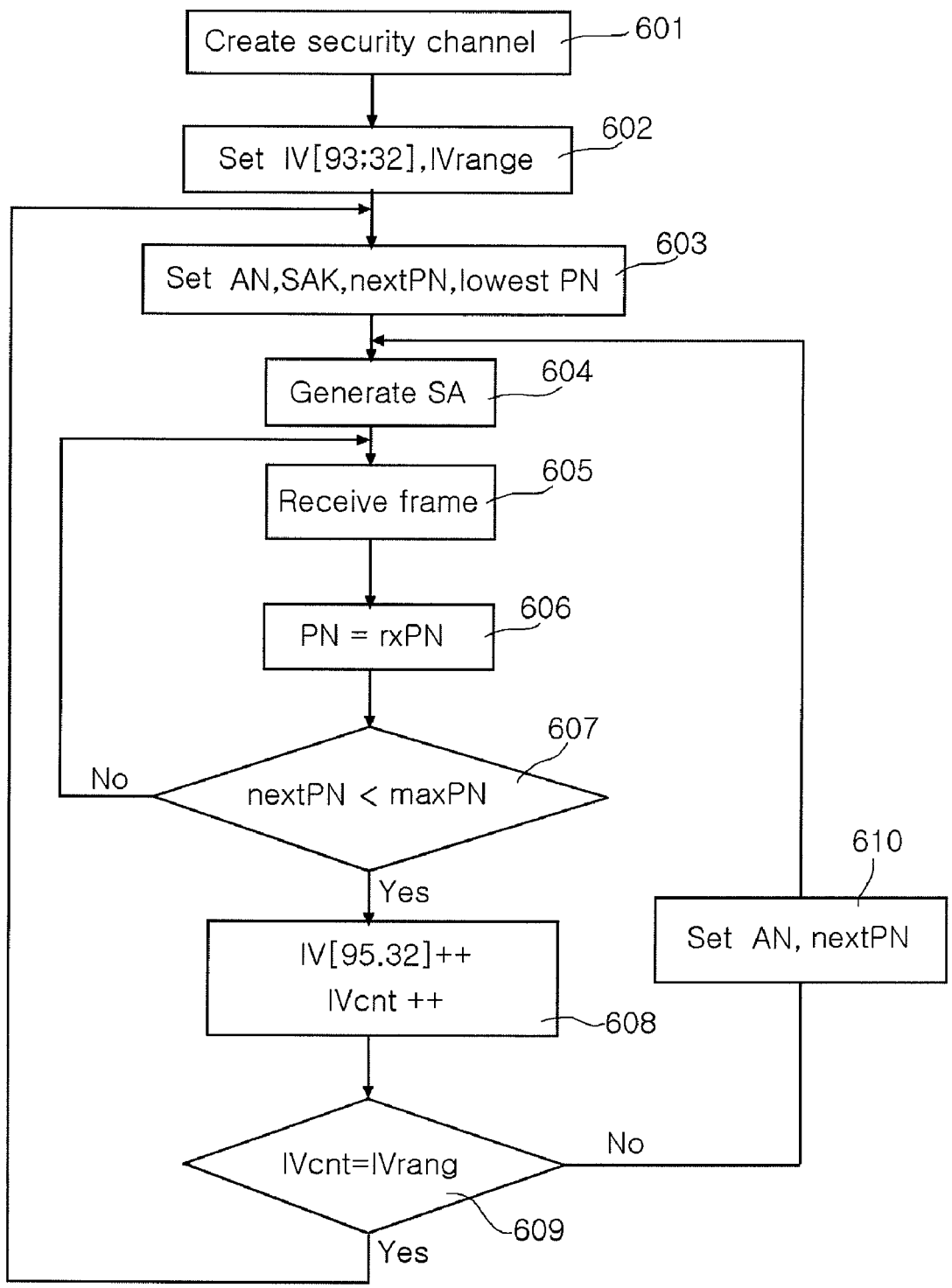
FIG. 6 is a flowchart illustrating a processing procedure of a receiving side in a method for controlling a security channel in a MAC security service network according to an embodiment of the present invention.

FIGS. 5 and 6 show a method for controlling a security channel in a MAC secure service network according to an embodiment of the present invention. FIG. 5 is a flowchart of a method for controlling security channel in a transmitting side, and FIG. 6 is a flowchart of a method for controlling security channel in a receiving side.

At first, the security channel controlling method in the transmitting side for extending a life time of a security association key will be described with reference to FIG. 5.

In order to transmit and receive a MAC secure frame between a transmitting terminal and a receiving terminal in a MAC secure service network, an upper bit value of an initialization vector, for example, the upper 64 bits of the 96 bits initialization vector, and a use period (IVrange) of the initialization vector upper bit value are set at step S502, when a security channel is created at step S501. The set upper bit value and use period of the initialization vector are shared with the receiving terminal.

Then, an association number (AN), a next packet number (PN) for transmitting a next frame, and a security association key (SAK) are set at step S503, and a secure association (SA) with the receiving terminal is created at step S504.

Figure 1:
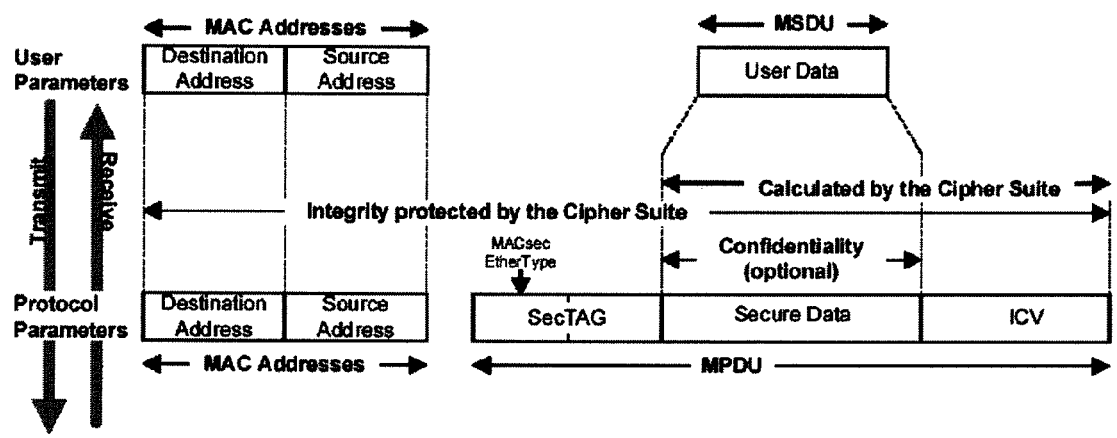
FIG. 1 is a diagram illustrating a structure of a MAC security frame introduced by IEEE 802.1AE.
Figure 2:
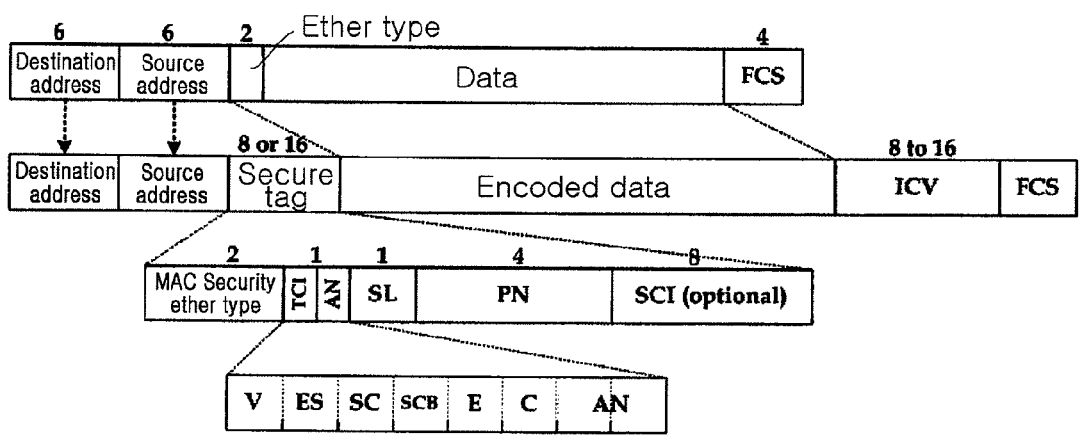
FIG. 2 is a diagram illustrating a method for transforming a transmitting frame in a MAC security service network.
Figure 3:
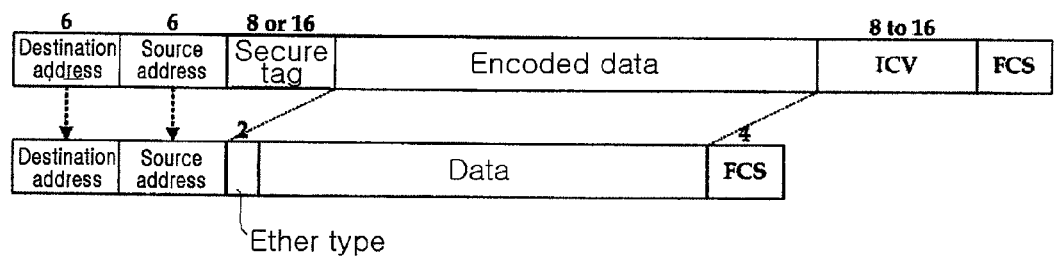
FIG. 3 is a diagram illustrating a method for transforming a receiving frame in a MAC security service network.
Figure 4:
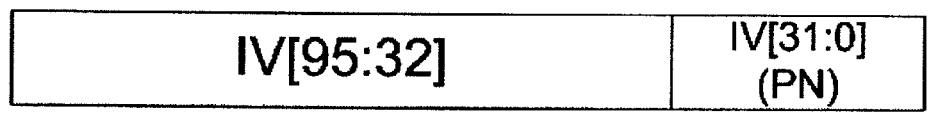
FIG. 4 is a diagram illustrating a structure of an initialization vector in a MAC security introduced by IEEE 802.1AE.

If a corresponding transmitting terminal generates a frame to transmit, a transmitting frame is encrypted using an initialization vector (IV) formed of the set next PN and the upper bit value (IV[95:32]) of the shared initialization vector, and the SAK shared with the receiving terminal. Then, the transmitting terminal creates the MAC secure frame as shown in FIG. 2 and transmits the created MAC secure frame to the receiving terminal.

In order to control the security channel in the present embodiment, the nextPN is modified as much as a predetermined unit whenever the transmitting frame is transmitted at steps S505 and S506. For example, the next PN increases by one when a frame is transmitted.

Then, it determines whether all of available packet numbers are used or not. That is, it compares the set next packet number (nextPN) with a maximum packet number (maxPN) to determine the availability of the packet number at step S507.

As a result of comparison, if any available packet numbers are left, for example, if the nextPN is smaller than the maximum packet number (maxPN), the nextPN increases by a predetermined unit when a frame is transmitted.

If all of the available packet numbers are used within a corresponding secure association, the upper bit value IV[95:32] of the initialization vector is modified as much as the predetermined unit, and a variable IVcnt for checking the usage of the initialization vector increases by one at step S508. For example, the upper bit value IV[95:32] increases by one or by two, and the unit of modifying the upper bit value can be set variously.

Then, it determines whether the amount of using the initialization vector is in the predetermined using range (IVrange) or not at step S509. If it is in the using range, the next PN is newly set, and a new SA is created with using the previously shared security association key at steps S510 and S504. By changing the association number (AN), the replay attack of a corresponding packet can be prevented.

Afterward, the upper bit value of the newly set initialization vector is used with the previously set security association key. Therefore, the use period of the security association key can be extended by not overlapping the initialization vector within the same security association key.

Hereinafter, the operation of a receiving terminal corresponding to the transmitting terminal will be described with reference to FIG. 6.

As like the transmitting terminal, when the receiving side creates a secure channel with the transmitting terminal at step S601, the receiving side sets the upper bit value of the initialization vector shared with the transmitting terminal, for example, the upper 64 bit value (IV[95:32]) of the 96 bit initialization vector, and the using range (IVrange) of the upper bit value at step S602.

The receiver terminal sets an association number (AN), a next packet number (nextPN) to be used for transmitting a next frame, a security association key (SAK), and a lowest packet number (lowestPN) at step S603. Then, a secure association (SA) is created between the receiving terminal and the transmitting terminal at step S604.

If the receiving terminal receives the MAC frame from the transmitting terminal at step S605. The packet number is extracted from the SecTag of the received MAC secure frame and sets the nextPN at step S606.

Then, the received frame is decoded using the initialization vector IV made of the set nextPN and the upper bit value (IV[95:32]) of the shared initialization vector, and a secure association key (SAK) shared with the transmitting terminal.

In the present embodiment, in order to control the security channel by synchronizing it with the transmitting terminal, the receiving terminal determines whether all of available packet numbers are used or not. That is, the set nextPN is compared with the maxPN at step S607.

If the nextPN is smaller than the maxPN, the steps S605 and S606 are performed again.

On the contrary, if all of available packet numbers are used within a corresponding secure association, the upper bit value of the initialization vector is modified as much as a predetermined unit in order to extend the use period of the SAK, and a variable IVcnt increases by one for checking the amount of using the initialization vector at step S608. For example, the upper bit value of the initialization vector can increase by one or two. Such a unit of changing the upper bit value may be set variously. Also, the amount of changing the initialization vector is set to be identical in the receiving terminal and the transmitting terminal.

Then, the receiving terminal determines whether the amount of using the initialization vector is in the predetermined using range (IVrange) or not at step S609. As a result, if it is in the predetermined using range, the nextPN is newly set, and a new SA is created with using the previously shared SAK at steps S610 and S604. By changing the association number (AN), the replay attack of a corresponding packet can be prevented.

Afterward, the upper bit value of the newly set initialization vector is used with the previously set security association key. Therefore, the use period of the security association key can be extended by not overlapping the initialization vector within the same security association key.

As described above, the lift time of the security association key can be extended using the upper 64 bits of the initialization vector of 96 bits. That is, although the use period of the packet number is expired, the number of the frames used in the same security association key can increase as much as total ($2^{64}$-1) times, comparing to that in the conventional technology by changing the upper 64 bit value of the IV.

In the present embodiment, the use period of the security association key can be calculated as like Eq. 2 under the assumptions that the length of the Ethernet frame is 64 bytes, the transmit rate is a level of a giga bit Ethernet, and a MAC-sec framing overhead is about 24 bytes.

$$Tk = (Lf + Lp + Lo + Lg) \times (2^{32} - 2) \times 8 \text{ ns} \times (2^{64} - 1) \quad \text{Eq. 2}$$
$$= (64 + 8 + 24 + 12) \times (2^{32} - 2) \times 8 \text{ ns} \times (2^{64} - 1) \div 3710 \text{ sec} \times$$
$$(2^{64} - 1)$$

In Eq. 2, Lf denotes the length of the frame in a unit of byte, Lp denotes the length of the preamble in a unit of byte, Lo denotes the length of the overhead in a unit of byte, Lg denotes a gap between frames in a unit of byte, and 8 ns is a time taken for transmitting one byte in gaga-bit transmit rate.

As shown in Eq. 2, the life time of the security association key is extended. That is, the number of transmittable frames increases within a same security association key. It also means that a period of generating and distributing the security association key can be further extended. Therefore, the number of operations for generating and distributing the security association key can be significantly reduced compared to that of the conventional method. As a result, the system load of generating and distributing the security association key can be reduced.

Figure 7:
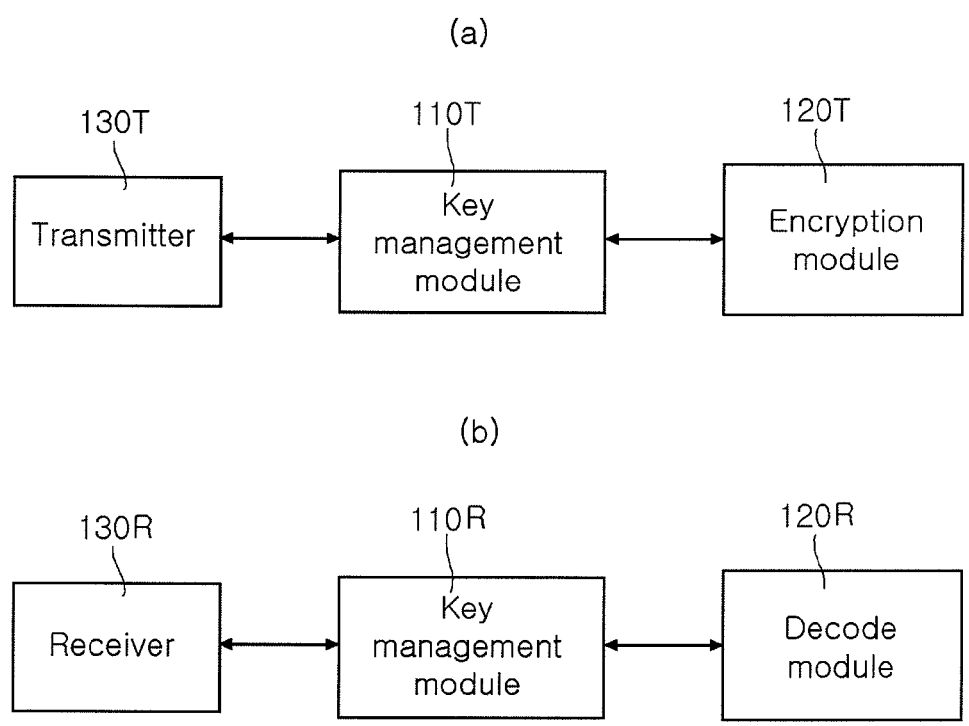
FIG. 7 is a block diagram illustrating a terminal of a MAC security service network according to an embodiment of the present invention.

FIG. 7 is a block diagram illustrating a terminal using a method for controlling a security channel according to an embodiment of the present invention. In FIG. 7, a block diagram (a) shows a transmitting terminal, and another block diagram (b) shows a receiving terminal.

The transmitting terminal denotes a transmitting side that generates a MAC secure frame. Referring to FIG. 7(a), the transmitting terminal includes a key management module 110T, an encryption module 120T, and a transmitting unit 130. The key management module 110T sets a packet number corresponding to the upper bit value and the lower bit value of the initialization vector per a security channel, and sets the using range thereof. The key management module 110T also change the upper bit value of the initialization vector and the packet number within the set using range so that the initialization vector dose not have the identical value in the same security association key. The encryption module 120T encodes a transmitting frame using the security association key and the initialization vector from the key management module 110T. The transmitting unit 130 transmits the coded frame from the encryption module 120T to a communication network.

The receiving terminal denotes a receiving side that receives a MAC secure frame according to an embodiment of the present invention. As shown in FIG. 7(b), the receiving terminal includes a receiving unit 130R, a decode module 120R and a key management module 110R. The receiving unit 130R receives the encoded frame from the communication network. The key management module 110R sets the upper bit value of the initialization vector per a security channel, and sets the using range thereof. The key management module 110R also changes the upper bit value of the initialization vector so that the initialization vector does not have the identical value in the same security association key. The decode module 120R decodes the received frame from the receiving unit 130R using the security association key and the upper bit value of the initialization vector, which are provided from the key management module 110R.

The key management module 110T of the transmitting terminal shares the security association key with the key management module 110R of the receiving terminal through a mutual key distribution step. Also, they share the upper bit value of the identical initialization vector and the using range thereof in the present embodiment.

After generating a secure association between the transmitting terminal and the receiving terminal, frames are encoded and decoded by synchronizing them using the PN described in the MAC secure frame. In order to extend the use period of the security association key, the key management modules 110T and 110R modify the upper bit value IV[96:32] of the shared initialization vector by a predetermined unit, and reset the secure association using the identical security association key, thereby extending the use period of the security association key. Herein, by changing the association number of the secure association, the replay attack can be prevented while satisfying the specification of IEEE 802.1AE.

As described above, the lift time of one security association key extends by repeatedly using one security association key within a cryptographically safe range in the present invention. As a result, the system load of generating and distributing the security association key can be reduced. Accordingly, messages for distributing the security association key can be reduced too. Therefore, the communication efficiency can be improved.

While the present invention has been described with reference to the particular illustrative embodiments and the accompanying drawings, it is not to be limited thereto but will be defined by the appended claims. It is to be appreciated that those skilled in the art can substitute, change or modify the embodiments into various forms without departing from the scope and spirit of the present invention.

What is claimed is:

1. A method for controlling a security channel in a MAC security service network performing an encoding of transmitting/receiving frame using a parameter including a security association key and an initialization vector, comprising the steps of:

configuring at least one processor to perform the functions of:

a) sharing an upper bit initial value of an initialization vector of an encryption algorithm and a predetermined using range thereof between a transmitting side and a receiving side when a security channel is created;

b) creating a secure association between a transmitting side and a receiving side by setting an association number, a next packet number which is a lower bit value of the initialization vector, and a secure association key;

c) changing a packet number whenever a frame is transmitted until all of predetermined packet numbers are used; and d) changing the upper bit value of the initialization vector when all of the predetermined packet numbers are used so as to extend a life time of said secure association key, wherein the initialization vector dose not have an identical value within a same security association key, and performing the step b).

2. The method according to anyone of claims 1, wherein in the step d), the association number changes when the upper bit value of the initialization vector change in order to prevent a replay attack.

3. A method for controlling a security channel in a MAC secure service network performing an encoding of a transmitting/receiving frame using a parameter including an security association key and an initialization vector, the method at a receiving side comprising the steps of:

configuring at least one processor to perform the functions of:

a) setting an upper bit initial value of an initialization vector of an encryption algorithm, and a predetermined using range thereof when a security channel is created;

b) creating a secure association between a transmitting side and a receiving side by setting an association number, a next packet number which is a lower bit value of the initialization vector, and a secure association key;

c) determining whether a packet number indicated in a frame received through the security channel is a maximum packet number or not; and d) changing the upper bit value of the initialization vector if the indicated packet number is the maximum packet number so as to extend a life time of said secure association key, wherein the initialization vector dose not have an identical value within a same security association key, and performing the step b).

4. A terminal of a MAC secure service network comprising:

a key management device module for setting an upper bit value of an initialization vector, a packet number that is a lower bit value of the initialization vector, and a predetermined using ranges thereof, and changing the upper bit value of the initialization vector when all of a predetermined packet numbers are used so as to extend a life time of a secure association key, wherein the initialization vector dose not have an identical value within a same security association key;

an encryption device module for encrypting a transmitting frame using the security association key and the initialization vector, which are provided from the key management device module; and a transmitting device unit for transmitting the encrypted frame from the encryption device module.

5. A terminal of a MAC secure service network comprising:

a receiver for receiving an encrypted frame from a communication network;

a key management device module for setting an upper bit value of an initialization vector, a packet number that is a lower bit value of the initialization vector, and a predetermined using range thereof, and changing the upper bit value of the initialization vector when all of a predetermined packet numbers are used so as to extend a life time of a secure association key, wherein the initialization vector does not have an identical value within a same security association key; and a decode device module for decoding the received frame from the receiver using the security association key and the upper bit of an initialization vector, which are provided from the key management module, and the packet number included in the received frame.

6. The terminal according to claim 5, wherein the key management module changes an association number (AN) when changing the upper bit value to prevent a replay attack.

* * * * *